2 Sheets--Sheet 1.

O. N. & A. J. ANGELL.

Turbine Water-Wheels.

No. 6,178. Reissued Dec. 22, 1874.

Witnesses:

Fred. Artos

J. H. Colby

Inventors:

Otis N Angell

Andrew J. Angell

By D. C. Colby & Son

Attorneys

THE GRAPHIC CO. PHOTO-LITH. 39 & 41 PARK PLACE, N.Y.

O. N. & A. J. ANGELL.

Turbine Water-Wheels.

No. 6,178. Reissued Dec. 22, 1874.

Witnesses:
Fred. Artes
J. F. Colby

Inventors:
Otis N. Angell
Andrew J. Angell
By D. C. Colby & Son
Attorneys

THE GRAPHIC CO. PHOTO-LITH. 39 & 41 PARK PLACE, N.Y.

UNITED STATES PATENT OFFICE.

OTIS N. ANGELL AND ANDREW J. ANGELL, OF PROVIDENCE, R. I.

IMPROVEMENT IN TURBINE WATER-WHEELS.

Specification forming part of Letters Patent No. 98,330, dated December 28, 1869; reissue No. 6,178, dated December 22, 1874; application filed April 12, 1871.

*To all whom it may concern:*

Be it known that we, OTIS N. ANGELL and ANDREW J. ANGELL, both of the city and county of Providence, in the State of Rhode Island, have invented certain new and useful Improvements in Turbine Water-Wheels, of which the following is a specification:

Our invention consists in the novel combination, with a horizontal wheel mounted on a vertical spindle, and having the lower portion of the sides or rim of its case curved inwardly toward the center of the wheel, of a wheel-curb, which is arranged to deliver water to the wheel opposite said curved rim, and in a plane practically at right angles to the wheel-spindle, whereby the water is freely discharged, and in its passage through the wheel, and in its delivery therefrom, it is enabled to exercise a certain lifting force against said curved surface, and to that extent relieve the spindle-step from bearing-pressure, thereby lessening the friction of the bearing, and enabling the wheel to work with better results than if the weight of the wheel were not, in a measure, thus borne by the water. Our invention further consists in the combination, with inward eduction-ports, of downward-discharge single buckets of peculiar form, so arranged, with relation to said ports, that the water from each bucket will pass partially to the interior of the wheel through the ports, and partially downward from the buckets; and, still further, in the combination, with a wheel of the character described, of valve-gates and stationary guides; and we do hereby declare that the following specification, taken in connection with the drawings furnished and forming a part of the same, is a clear, true, and exact description thereof.

Figure 1:
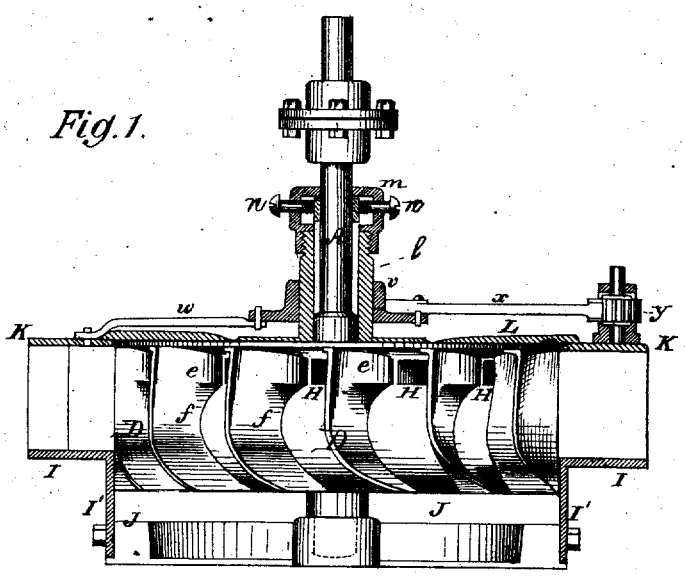
Figure 2:
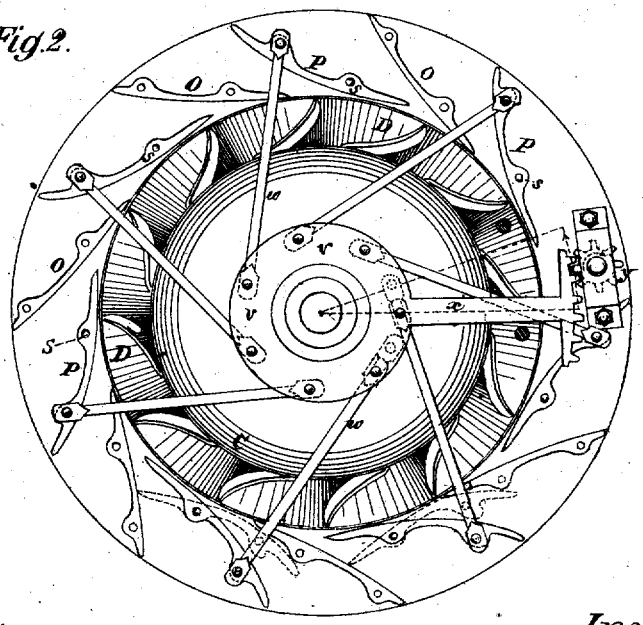
Figure 3:
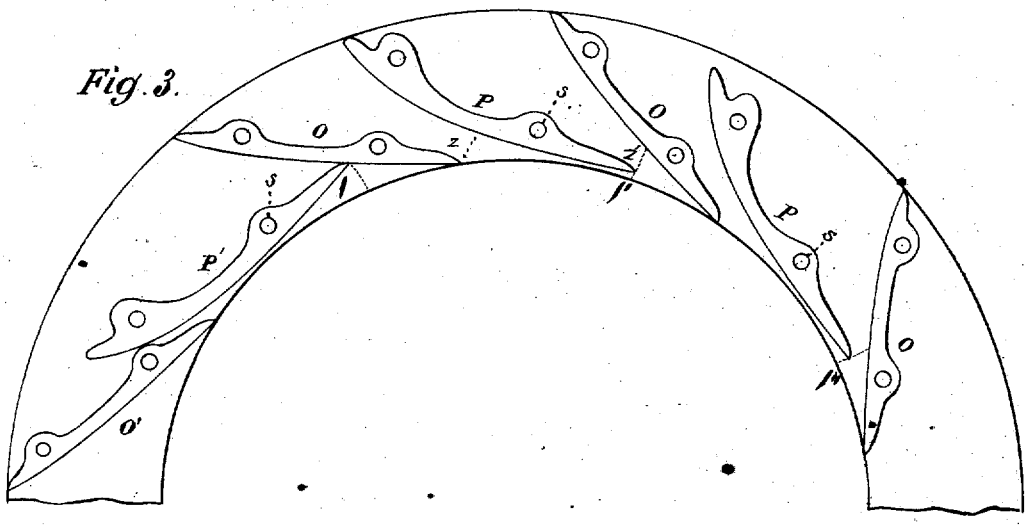
Figure 4:
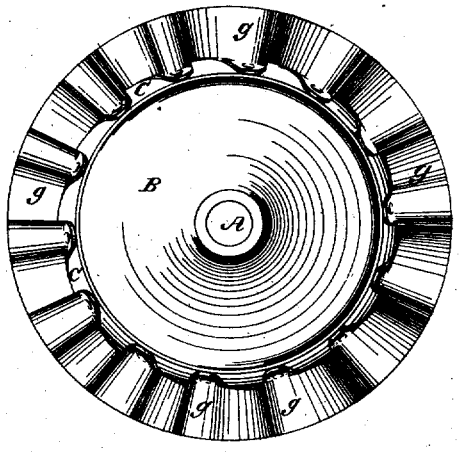
Figure 5:
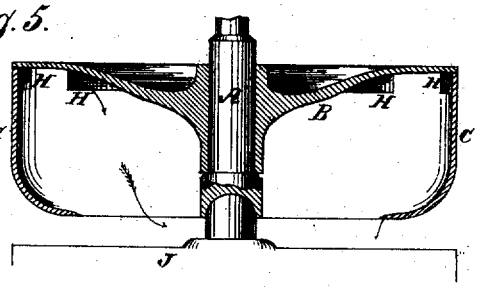

In the drawings, Figure 1 is a vertical bisection of the wheel-case, and side view of the wheel itself; Fig. 2, a plan of the wheel and its case, the upper plate of the case in both of its parts being removed, as also the top plate of the wheel, presenting the buckets of the latter, and the gates and guides in the case, in their relative positions; Fig. 3, a portion of the case in plan, enlarged, exhibiting different positions of the gates; Fig. 4, a view of the wheel from the bottom; Fig. 5, a bisection of the wheel, from which may readily be discovered the peculiar form of the case of the wheel, onto which the buckets are built, or to which they are secured.

A denotes the wheel-shaft. B denotes the top plate of the wheel, firmly attached to the shaft. C denotes the main case of the wheel, formed like a bowl, open at the bottom. Onto this the buckets are built and fastened. The special feature of the formation of this case C is its having straight sides, descending vertically for about half its depth, and then curving inwardly, and leaving a small opening in the center, as illustrated in Fig. 5 of the drawings. D denotes the buckets, the inner edges of which conform to the cone-shape of the case or partition C, to which they are firmly attached. *e* denotes the upper and inner plane face of the buckets D; and *f*, the descending portion of the buckets, exhibiting, near the upper portion, a retreating concave face, which continues downward and backward, widening all the way, to correspond to cone shape of the inner wall C, thus increasing the facilities for discharging water. (See Figs. 1 and 4.) *g* denotes the lower quarter of the said buckets, which will be observed to have reached nearly a horizontal position, thus securing a direction to the discharging water as it leaves the wheel that will enable it to pass readily away without rebound or being suddenly checked. H denotes small openings through the wall of the conical inner case C, which we call eduction-ports, through which a portion of the water that strikes the buckets will flow to the center of the wheel, preventing all tendency to the formation of a vacuum there by the rapid discharge of the buckets. Passing to the outer case, within which the wheel rotates, I denotes an annular horizontal plate, from which descends a cylindrical eduction water-way, I′. J denotes a bridge-tree, of proper dimensions to support the wheel, and suitably attached to and supported by the cylinder I′, and itself bears the step for the water-wheel shaft at its center. K denotes an annular horizontal plate, very nearly corresponding to plate I, to which it lies parallel and directly above it. L denotes a central disk-plate, plane, or, if preferred, slightly crowning, attached firmly to plate K by screw-bolts, and having an elevated hub, *l*, through which runs the shaft A, as represented in Fig. 1. *m* denotes a stuffing-box, with adjusting-screws *n* for truing up the shaft. O denotes a series of supports or water-guides bearing the upper annular plate K, and giving stability to the case. These supports have purposely a peculiar formation and arrangement, fitting them to act as guides to the water approaching the wheel, forming in part the water-chute. (See Fig. 2.) P denotes a series of plates, which we call oscillating gates. The arrangement and operation of these may be readily perceived in Figs. 2 and 3. *s* in each instance denotes a bolt passing down perpendicularly through plate K, and through suitable lugs near top and bottom of each of the plates P, forming the pivots on which said gates oscillate or turn, as they are swung open or closed.

The following is the mechanism through which the above-described water gates are operated, (this, however, is not claimed as any part of our invention:)

*v* is a collar, fitted loosely upon the hub *l*, as in Fig. 1. *w* denotes a series of arms arranged so that one end of each will connect with one of the gates P, and the other end with flanged rim of collar *v*. (See Figs. 1 and 2.) *x* denotes a lever extending outwardly from collar *v*, and terminating with a segmental circular rack. *y* denotes a pinion operating lever *x*, which, turning collar *v*, causes the arms *w* to be drawn inwardly or pushed outwardly, thus closing or opening, as desired, the gates P.

As we consider our improvements relate to the inner rim C, the buckets D, and eduction-ports H, so far as the wheel is concerned, and the gates P and guides O in the wheel-case, we will now give a more full description of the peculiarities in which our invention consists, and the advantages thereof.

The contracted or inverted-cone form of the inner wheel rim or case C on its lower portion is to provide abundant space for the water to leave the wheel freely and so promptly that it can never be crowded or water-loaded. Not only is this free discharge effected, but as the water emerges from the gates and strikes the wheel its force or pressure is partially directed against the inwardly-curved surface of the rim, and to a valuable degree serves to relieve the spindle and its step from the weight otherwise borne by it, resulting in an appreciable saving of friction, and a consequent gain in power, as well as contributing to the durability of the step and spindle. It will be seen that with a wheel-case having merely a greater diameter at the top than at the bottom these results would not occur; as, for instance, if the side of the case was slightly inclined in a straight line downward and inward, there must obviously be an inward incline of such a pitch or curve as will permit the water to exercise a lifting force against the curved surface. The peculiar curve given this rim appears in Fig. 5, and corresponds and fits to the curving inner edge of buckets D.

The especial features of the buckets as to form and contour appear best in Fig. 1. The peculiarity is in the plane upper portion of the inner face *e*, so arranged as to invite a portion of the water toward the eduction-ports H, and the falling widening curved surface so formed and arranged as to receive the main force of the percussion under the longest leverage, and yet provide for such a free retirement of the water as to produce no retarding reaction.

The eduction-ports H are in the upper portion of the rim C, and are purposely placed immediately behind the buckets, so that while they admit water to the center of the wheel, to prevent vacuum tendency there, they admit this in such manner that the reaction that necessarily results from the flow of water through these ports shall not be against the rotation of the wheel, but shall materially help it—that is, shall act in harmony with and auxiliary to the water upon and leaving the main face of the buckets.

It will be perceived that our device on these points of reception, division, and discharge of the water is entirely unlike that in wheels having two separate series of buckets, one discharging inwardly toward the center of the wheel, the other downward, in that we do not divide the water arbitrarily, as those do, but, admitting the whole stream with all its unbroken force upon the face of the bucket, we leave it to divide itself, a small portion going through the eduction-ports H backwardly, having received direction by the face *e* of the bucket, which is nearly tangential to the rim C, and the main portion moving off down the buckets. The more or less in each of those directions will be just in accordance with the requisitions to preserve, at all times, equilibrium at the base of the wheel. To secure this desired tangential direction of the water the guides O and gates P, which form the perpendicular sides of the chutes, have a peculiar structure and conformation. The face of these gates and guides does not describe a uniform segment of a circle, but is parabolic, as though indicating the parabola of a cone whose apex would be outward or toward the incoming water; or, in plainer language, that part of the face nearest the wheel indicates a larger circle, while that part more removed from the wheel is tending to a smaller circle. (See Figs. 2 and 3.). The guides O, being always stationary, may have that portion of their inner face fronting immediately upon the wheel nearly or quite straight, or scarcely curved at all, as the one marked O′ in Fig. 3, and that line always tangential, or nearly so, to the wheel. The part of the inner face of the oscillating gates P just next the wheel has more curve than the corresponding face of the guides. The object of this is to secure a surface tangential to the wheel, and that upon the portion of this face nearest to the wheel, at all positions of the said gates—that is, open little or much. (See Fig. 3.) The placing of the guides is such that they shall co-operate with the gates in directing the water, and in shutting it off when the gates are given the position indicated in dotted lines in Fig. 2, or closed, as is P′ in Fig. 3.

It will be observed that the form of the oscillating gates P and the placing of the bolts is such that the space at *z*, between the inner face thereof and the inner end of the guide, and the space at *z′*, between the guide and the inner end of the gate, are equal at whatever position of the gates, securing uniformity of water-distribution through all the chutes.

The closeness of the inner ends of the fixed guides O to the wheel, and the nearness of that part of the gate which delivers the water to the wheel, and marked 1, 1′, and 1″ in the various positions indicated in Fig. 3, acting in conjunction with the tangential direction of the water, operate to give this very great superiority when using a very small supply of water.

The form and arrangement of our gates and guides are such that, however small the supply of water to the wheel, the same will have the full vertical depth of the chute, and will strike the buckets at the longest possible leverage, and the form of the buckets conduces to retain the greater portion of the water at the very periphery of the wheel until it leaves it at the bottom.

We do not claim the general arrangement of the wheel, or of the wheel-case, or of the mechanism, as shown, for operating the gates; nor do we claim arranging in a wheel-case a series of oscillating gates and fixed guides in alternation.

What we do claim as our invention, and desire to secure by Letters Patent, is—

1. A water-wheel mounted on a vertical spindle, and having a rim or case with sides partially straight and partially curved downward and inward toward the center of the wheel, in combination with a wheel-curb arranged to deliver water to the wheel in a plane at right angles to the wheel-spindle, substantially as described, whereby a free discharge of water is effected, and the spindle and step relieved of the weight of the wheel to the extent of the lifting force exerted by the water against the surface of the inwardly-curved case, as specified.

2. The buckets D D, formed substantially as described, with an inward horizontal and a downward discharge, arranged in relation to, and in combination with, the eduction-ports H, as shown and specified.

3. The improved turbine-wheel herein described, provided with the buckets D D and the ports H, in combination with the valve-gates P and the stationary guides O, the parts being arranged and operating substantially as described, for the purposes specified.

OTIS N. ANGELL.
ANDREW J. ANGELL.

In presence of—
HENRY MARTIN,
JOHN C. PURKIS.